(12) United States Patent
Takeuchi

(10) Patent No.: US 6,985,305 B2
(45) Date of Patent: Jan. 10, 2006

(54) ZOOM LENS

(75) Inventor: Hotaka Takeuchi, Saitama (JP)

(73) Assignee: Nidec Copal Corporation, Tokyo (JP)

( * ) Notice: Subject to any disclaimer, the term of this patent is extended or adjusted under 35 U.S.C. 154(b) by 39 days.

(21) Appl. No.: 10/625,474

(22) Filed: Jul. 22, 2003

(65) Prior Publication Data
US 2005/0024737 A1 Feb. 3, 2005

(30) Foreign Application Priority Data
Jul. 22, 2002 (JP) .............................. 2002-212232

(51) Int. Cl.
G02B 15/14 (2006.01)
(52) U.S. Cl. ...................... 359/689; 359/680; 359/676
(58) Field of Classification Search ......... 359/676–692
See application file for complete search history.

(56) References Cited

U.S. PATENT DOCUMENTS

| 4,059,344 A | * | 11/1977 | Yamasita | ..................... 359/783 |
| 5,648,835 A | | 7/1997 | Uzawa | ....................... 396/429 |
| 6,339,508 B1 | | 1/2002 | Nozawa et al. | ............. 359/686 |
| 6,728,482 B2 | * | 4/2004 | Hagimori et al. | ............. 396/72 |
| 2004/0070843 A1 | * | 4/2004 | Nishioka et al. | ............ 359/676 |

FOREIGN PATENT DOCUMENTS

| JP | 09-211287 | 8/1997 |
| JP | 2000-187160 | 7/2000 |

OTHER PUBLICATIONS

Patent Abstracts of Japan for JP2000-187160 published on Jul. 4, 2000.
Patent Abstracts of Japan for JP09-211287 published on Aug. 15, 1997.

* cited by examiner

Primary Examiner—Georgia Epps
Assistant Examiner—M. Hasan
(74) Attorney, Agent, or Firm—Darby & Darby

(57) ABSTRACT

The present invention provides a small, thin, light and low cost zoom lens suitable for cellular telephones, portable information terminals, etc. In particular, it can provide a small and thin, high performance zoom lens having a zoom ratio of approximately 2, a depth of less than 9 mm in shooting and storage, a total lens length of less than 29 mm, an angle of view of approximately 61°, and a F number of 2.8 or higher providing a sufficient light, with various aberrations all suitably corrected.

18 Claims, 16 Drawing Sheets

IMAGE PLANE

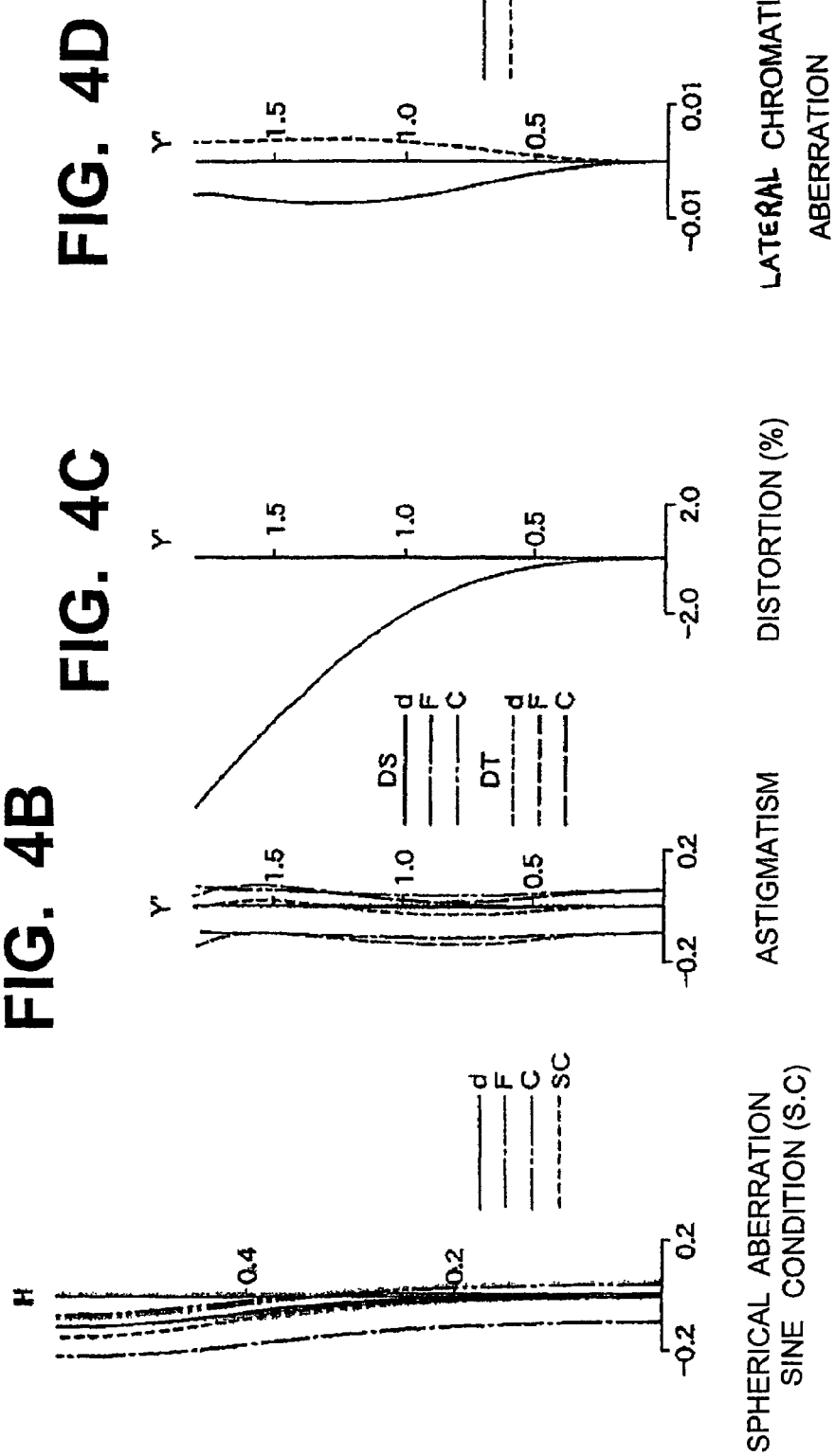

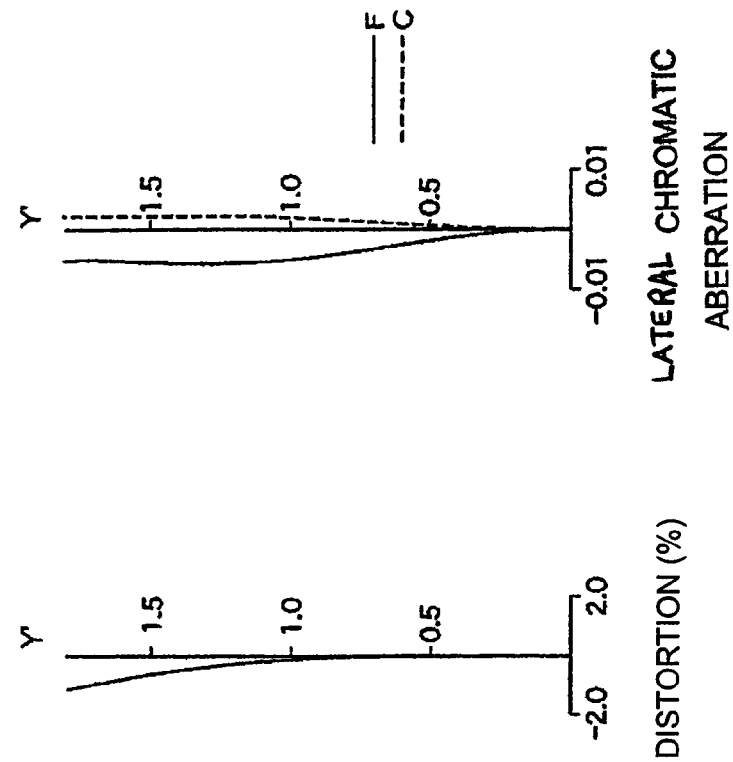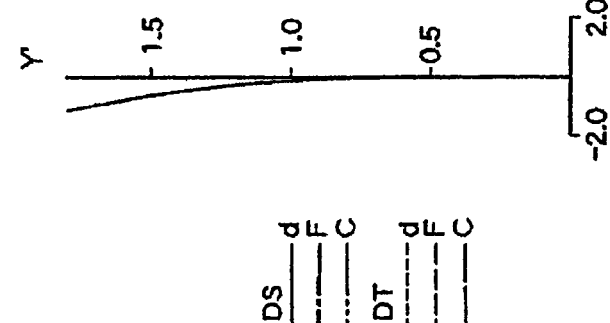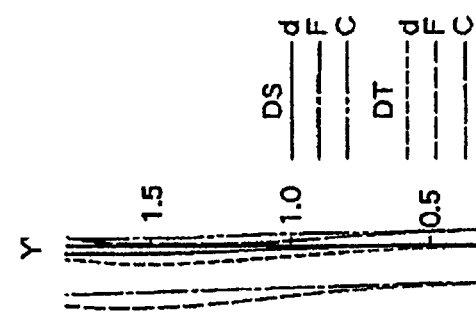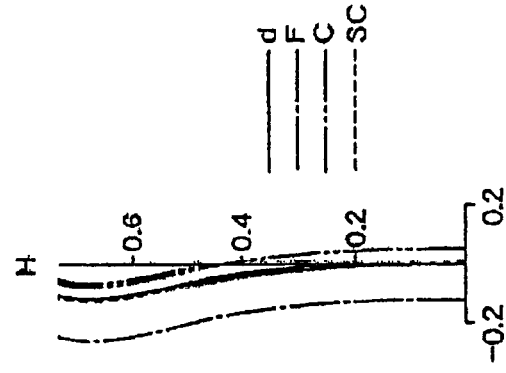

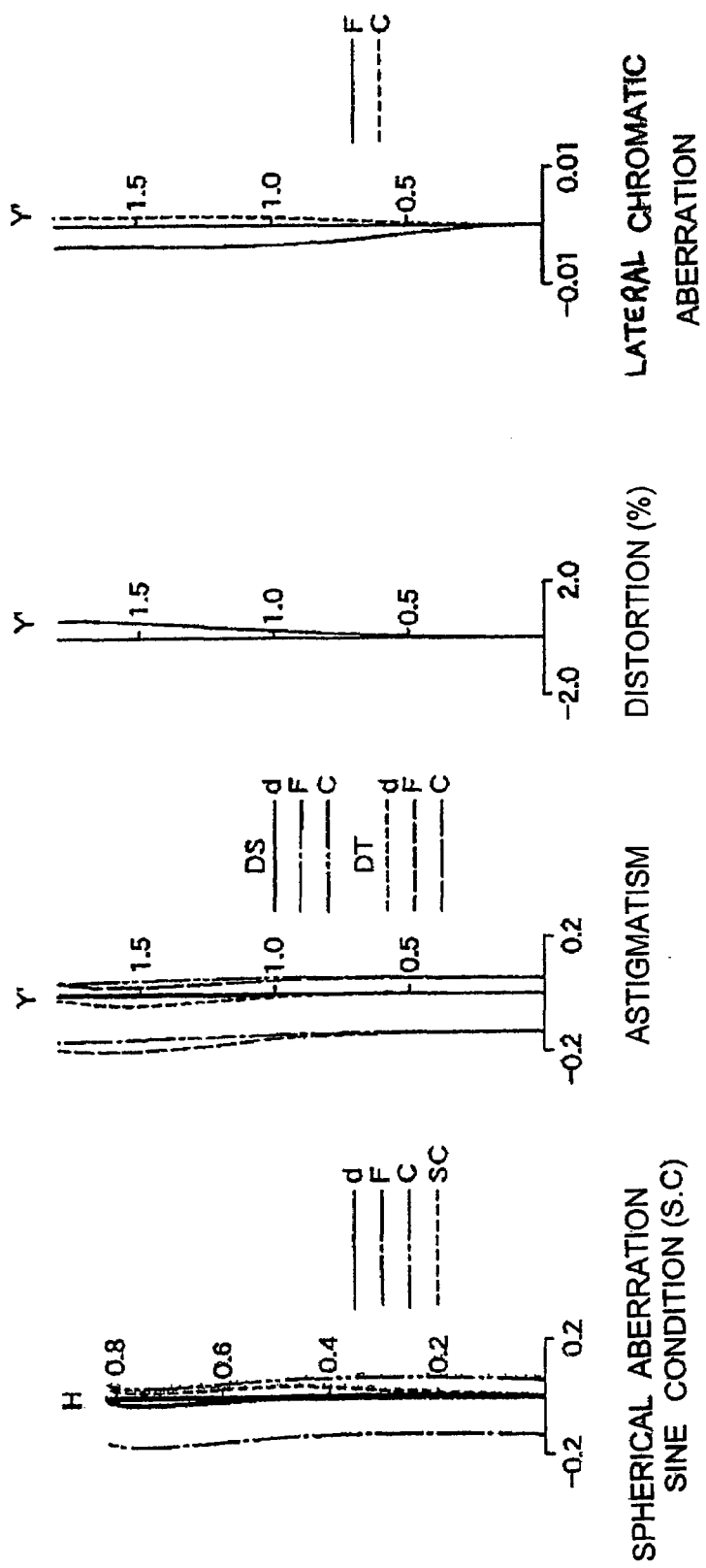

FIG. 8A
FIG. 8B
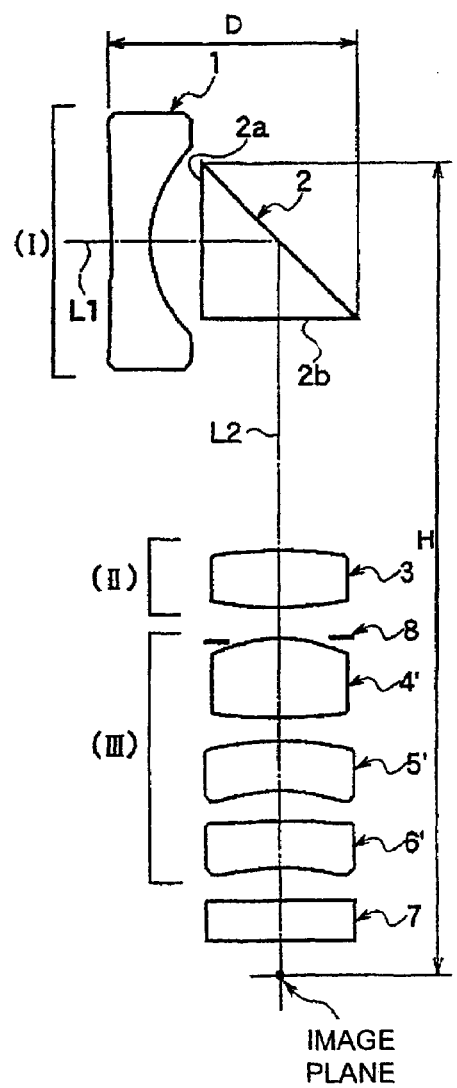
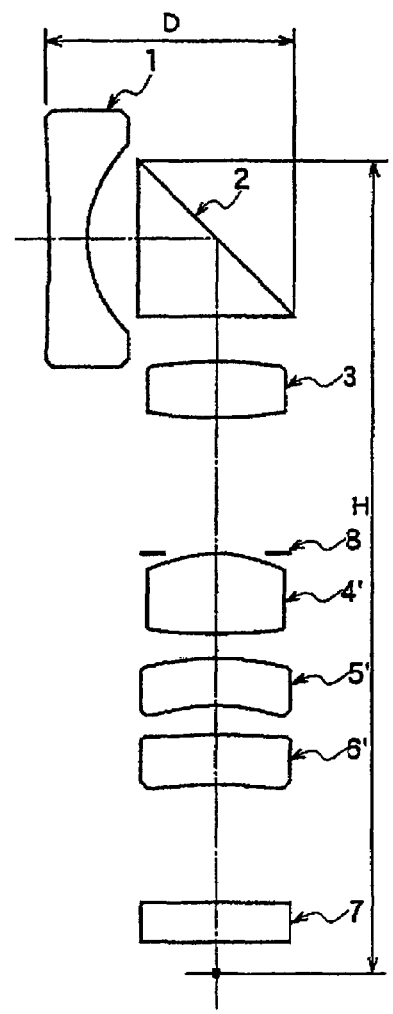
IMAGE PLANE

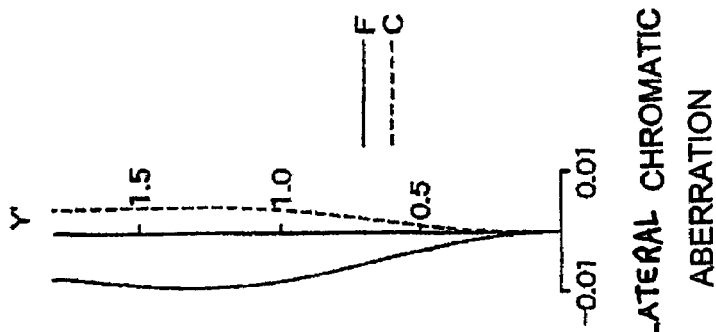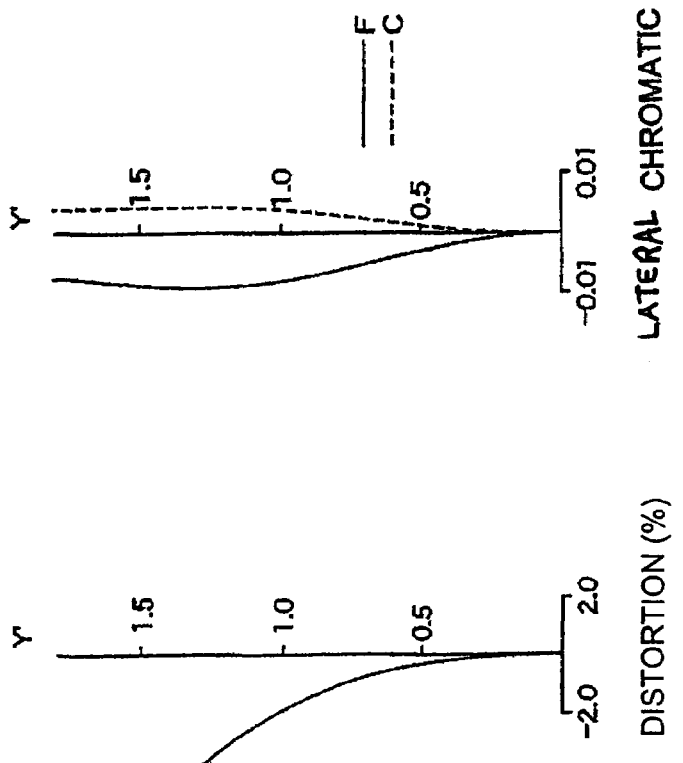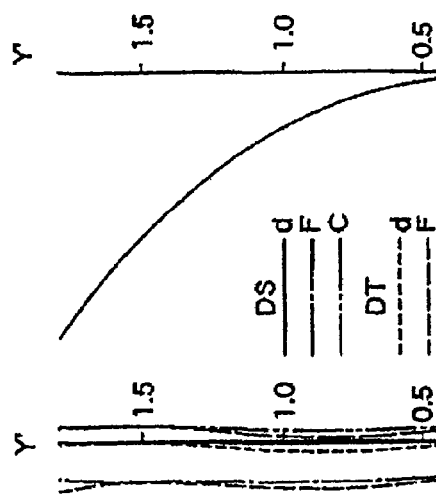

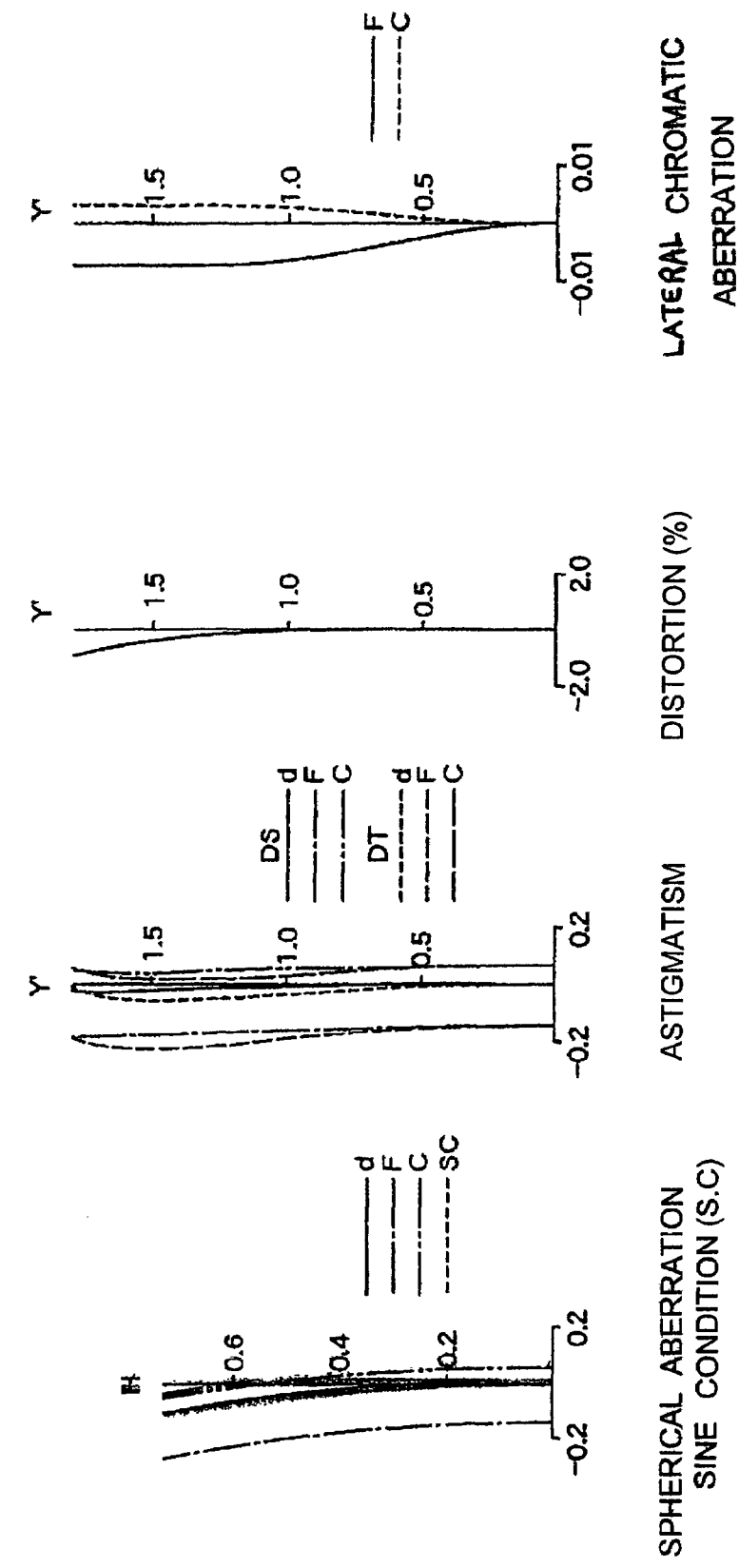

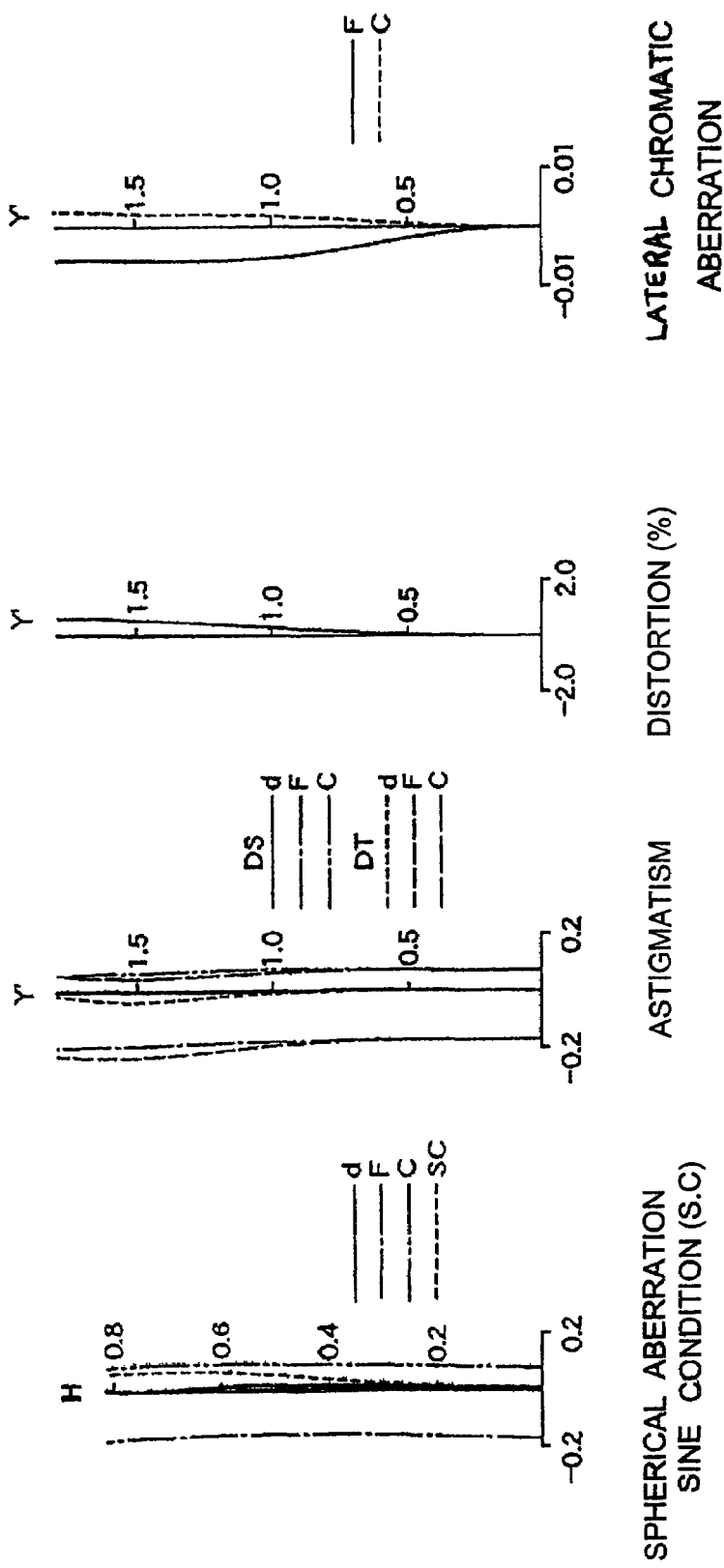

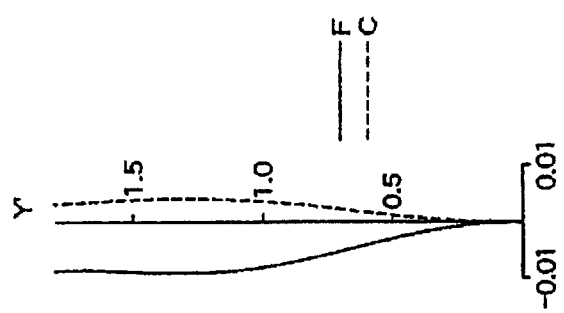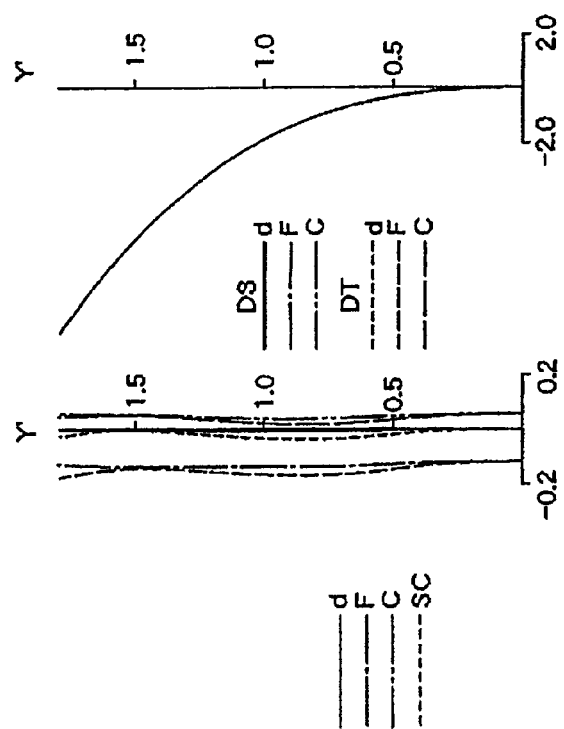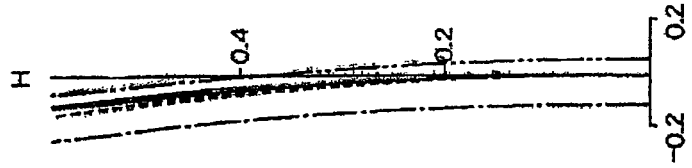

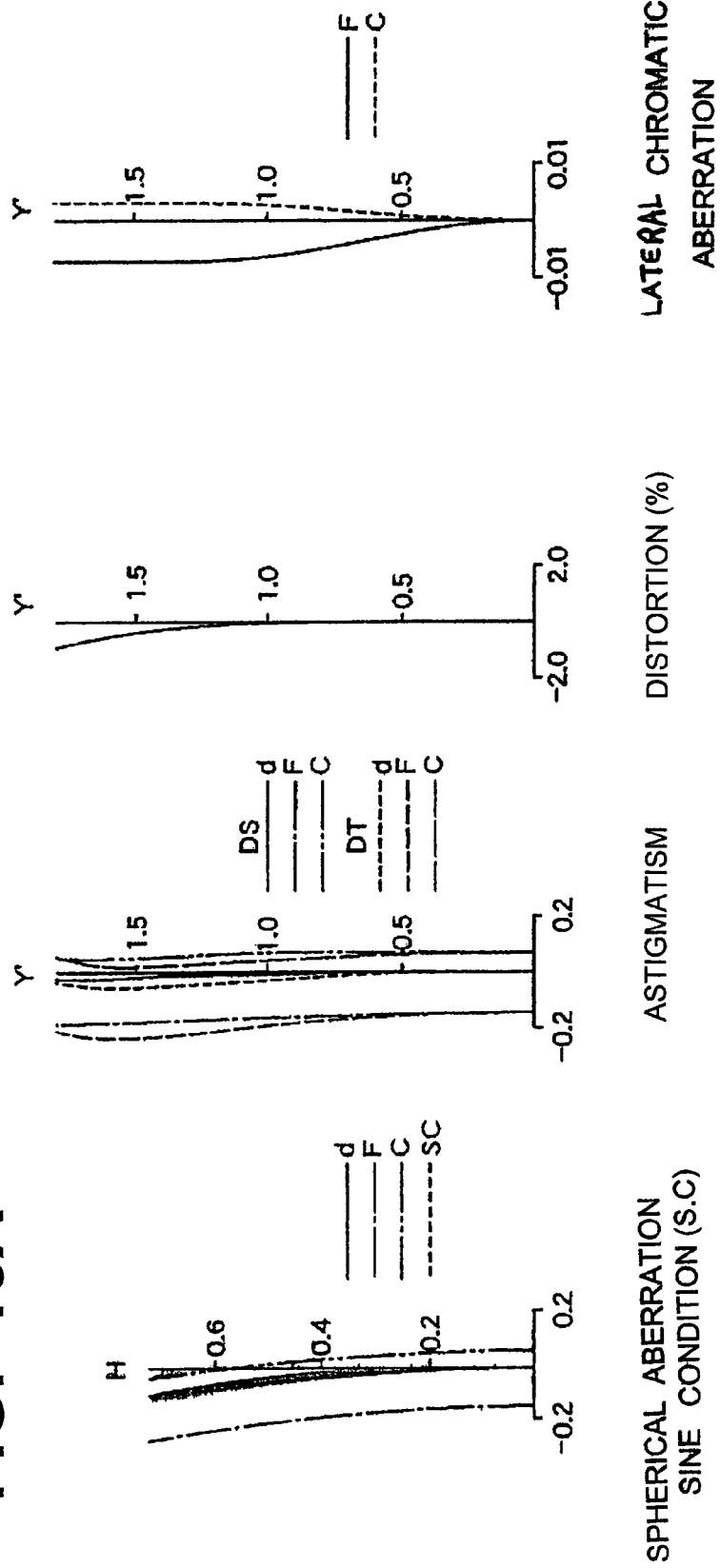

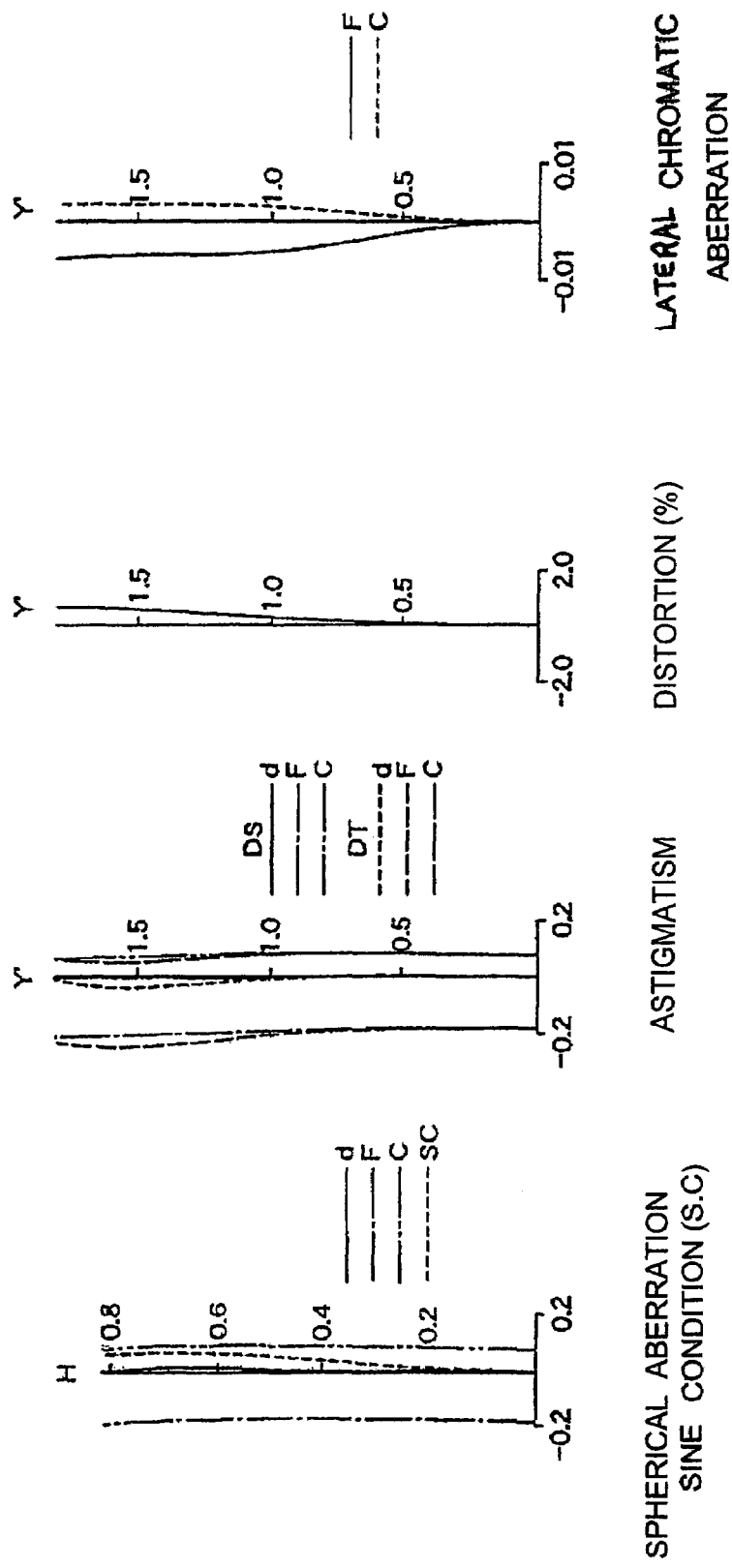

ZOOM LENS

FIELD OF THE INVENTION

The present invention relates to a zoom lens suitable for small digital still cameras, video cameras and the like equipped with image pickup devices such as CCD and the like, in particular, a zoom lens suitable for small digital still cameras, video cameras and the like built into cellular telephones, portable information terminals (PDA), etc.

DESCRIPTION OF THE RELATED ART

In recent years, due to remarkable technical advancements in solid state image pickup devices for uses in digital still cameras, video cameras and the like, small charge-coupled devices ("CCD") and similar devices are developed and, with it, a demand of smaller and lighter optical systems are in great demand.

In particular, there is a need for smaller and thinner optical systems to be used on cellular telephones and portable information terminals as they become smaller and thinner. The optical systems used on the cellular telephones and portable information terminals of the prior art have been relatively small and suitable for demands for smaller and thinner units because they were fixed focal point lens systems.

In order to have a zoom lens that provides variable magnifying power on a cellular telephone and a portable information terminal where a smaller and thinner unit is mandatory, it is necessary to have a plurality of lens barrels that are arranged to be able to slide in and out and cause them to collapse into the body when it is not in use in order to make the system thinner. The constitution of the lens barrels, including the collapsible mount mechanism, becomes more complex as the number of components increases.

In order to improve the above situation, the present invention intends to provide a small, thin, and lighter zoom lens having a high quality optical capability suitable for being used on cellular telephones and portable information terminals, more specifically, a zoom lens having a zoom ratio of about 2, a depth direction stroke in the incidence direction of the object light between the in-use and the not-in-use (stored) conditions of less than 9 mm, and the longest dimension when it is in-use of less than 27 mm.

SUMMARY OF THE INVENTION

The zoom lens of the present invention comprises: a first lens group having a negative refractive power as a whole, a second lens group having a positive refractive power as a whole, and a third lens group having a positive refractive power as a whole, arranged in said order from object side to image side, for zooming from a wide-angle end to a telephoto end as well as correcting image surface changes required in accordance with said zooming by means of moving said second lens group and said third lens group from image side to object side; wherein said first lens group consists of a lens having a negative refractive power and a prism for changing a light path arranged in said order from the object side.

Since the depth dimension of the zoom lens according to said embodiment is the depth dimension in the direction the object light enters into the first lens group (a lens and a prism), it is possible to obtain a thin and small zoom lens wherein the depth dimension and the dimension between the first lens group to the image surface remain constant regardless of whether it is used or not for shooting.

In the above embodiment, it is possible to adopt such a constitution wherein the second lens group consists of a lens with a positive refractive power and an aperture stop exists between the second lens group and the third lens group. In this embodiment, the total length in the optical axis direction becomes shorter and the lens groups on both sides (located on the upstream side and the downstream side) of the aperture stop can be formed in such a way as to have approximately identical external dimensions, so that the zoom lens can be made more compact efficiently.

In the above embodiment, it is possible to adopt such a constitution wherein the lens of the first lens group has an aspherical surface, the aspherical surface is formed on the surface with a smaller curvature radius, and the negative aspherical surface has a negative refractive power weakening toward its periphery. According to these embodiments, a better optical characteristic can be achieved as various aberrations can be easily corrected by having an aspherical surface, and distortion can be more easily corrected by having the aspherical surface on the surface with a smaller radius of curvature and forming it in such a way as to make the negative refractive power weaken toward the periphery.

In the above embodiment, said third lens group can be constituted to have at least one lens with a positive refractive power and at least one lens with a negative refractive power. According to said embodiment, various aberrations can be corrected with a better balance.

In the above embodiment, said third lens group can be constituted to have a lens at a position closest to the object having a positive refractive power and an aspherical surface at least on one side. According to said embodiment, spherical aberration can be corrected most suitably.

In the above embodiment, the prism of said first lens group can be formed to have an entrance surface and an exit surface both oblong in a direction perpendicular to a plane that includes an entrance axis and an exit axis. According to this embodiment, the zoom lens can be made thinner in the direction the object light enters (the direction of the optical axis from the first group's lens to the prism).

In the above embodiment, it is possible to adopt an embodiment that satisfies the following conditional formulas (1) and (2):

$$0.25 < |fw/f1| < 0.7 \quad (1)$$

$$v1 > 40 \quad (2)$$

where f1 is the focal length of the first lens group, fw is the focal length of the total lens system at the wide-angle end, and v1 is the Abbe number of the first lens group's lens. According to this embodiment, if the value of |fw/f1| in the conditional formula (1) exceeds its lower limit, the refractive power of the lens of the first lens group becomes too small, so that a necessary back focus cannot be achieved; on the other hand, if it exceeds the upper limit, the back focus becomes too large, so that it becomes difficult to make the unit smaller as well as to correct astigmatism and coma aberrations. Therefore, by satisfying the conditional formula (1), a better optical characteristic and size reduction can be achieved. Also, by satisfying the conditional formula (2), lateral chromatic aberration can be corrected appropriately.

In the above embodiment, the first lens group, the second lens group, and the third lens group can all be made of resin materials. This embodiment makes it possible to manufacture easily, to reduce the manufacturing cost and to reduce the weight.

BRIEF DESCRIPTION OF THE DRAWINGS

FIGS. 4(a), (b), (c) and (d) shows aberration charts of spherical aberration, astigmatization, distortion, and lateral chromatic aberration at the wide-angle end of the zoom lens according to the embodiment of FIG. 1.

FIGS. 5(a), (b), (c) and (d) shows aberration charts of spherical aberration, astigmatization, distortion, and lateral chromatic aberration at a middle position of the zoom lens according to the embodiment of FIG. 1.

FIGS. 6(a), (b), (c) and (d) shows aberration charts of spherical aberration, astigmatization, distortion, and lateral chromatic aberration at the telephoto end of the zoom lens according to the embodiment of FIG. 1.

FIGS. 8(a) and (b) show the side views of the zoom lens shown in FIG. 7 at its wide-angle end and telephoto end.

FIGS. 9(a), (b), (c) and (d) shows aberration charts of spherical aberration, astigmatization, distortion, and lateral chromatic aberration at the wide-angle end of the zoom lens according to the embodiment of FIG. 7.

FIGS. 10(a), (b), (c) and (d) shows aberration charts of spherical aberration, astigmatization, distortion, and lateral chromatic aberration at a middle position of the zoom lens according to the embodiment of FIG. 7.

FIGS. 11(a), (b), (c) and (d) shows aberration charts of spherical aberration, astigmatization, distortion, and lateral chromatic aberration at the telephoto end of the zoom lens according to the embodiment FIG. 7.

FIGS. 14(a), (b), (c) and (d) shows aberration charts of spherical aberration, astigmatization, distortion, and lateral chromatic aberration at the wide-angle end of the zoom lens according to the embodiment of FIG. 12.

FIGS. 15(a), (b), (c) and (d) shows aberration charts of spherical aberration, astigmatization, distortion, and lateral chromatic aberration at a middle position of the zoom lens according to the embodiment of FIG. 12.

FIGS. 16(a), (b), (c) and (d) shows aberration charts of spherical aberration, astigmatization, distortion, and lateral chromatic aberration at the telephoto end of the zoom lens according to the embodiment of FIG. 12.

DESCRIPTION OF NUMERICAL KEYS USED IN THE DRAWINGS

I First lens group
II Second lens group
III Third lens group
1 Lens (first lens group)
2 Prism (first lens group)
2a Entrance surface
2b Exit surface
L1 Entrance axis
L2 Exit axis
3. 3', 3" Lens (second lens group)
4, 4', 4" Lens (third lens group)
5, 5', 5" Lens (third lens group)
6 Lens (third lens group)
7 Glass filter
8 Aperture stop
D1–D14 Surface distance on optical axis
R1–6, 8–15 Curvature radius
S1–S15 Surface Preferred Embodiment A preferred embodiment of the present invention is described below referring to the accompanying drawings.

Figure 1:
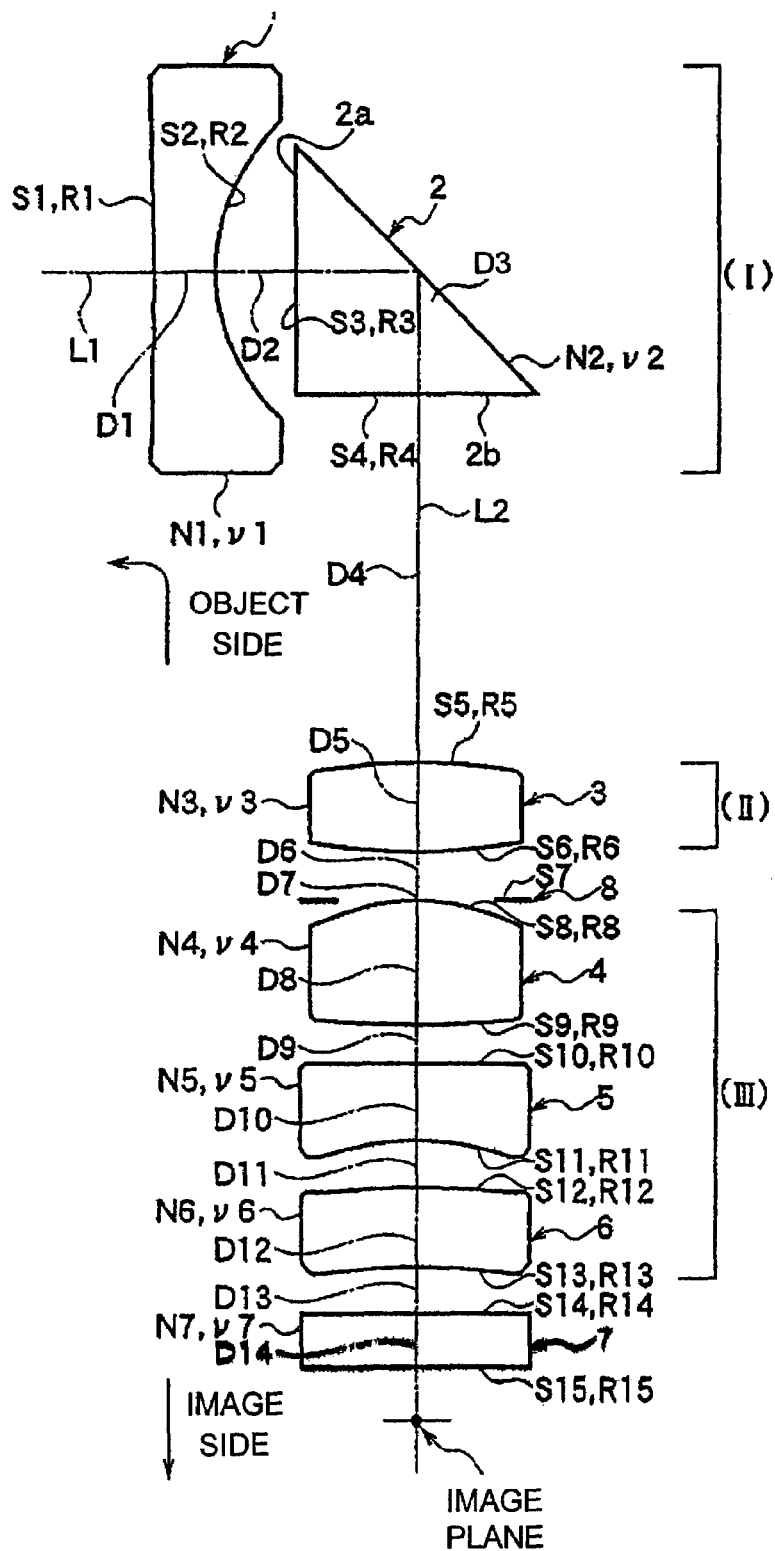
FIG. 1 is a drawing showing an embodiment of a zoom lens according to the present invention.
Figure 2A:
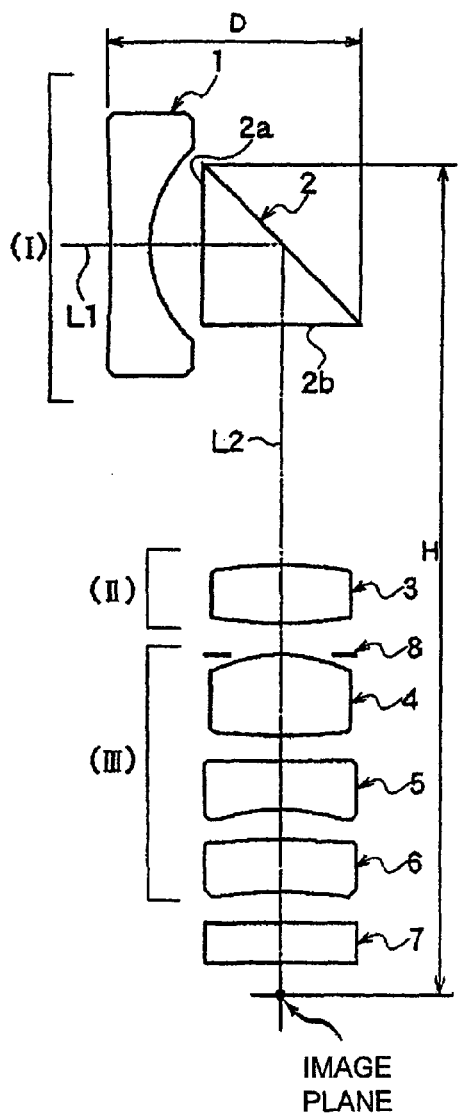
FIGS. 2(a) and (b) show the side views of the zoom lens shown in FIG. 1 at its wide-angle end and telephoto end.
Figure 2B:
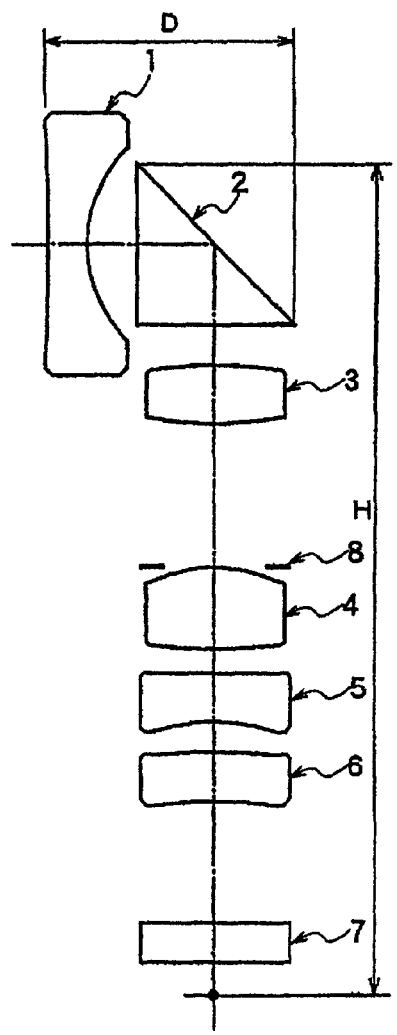
Figure 3:
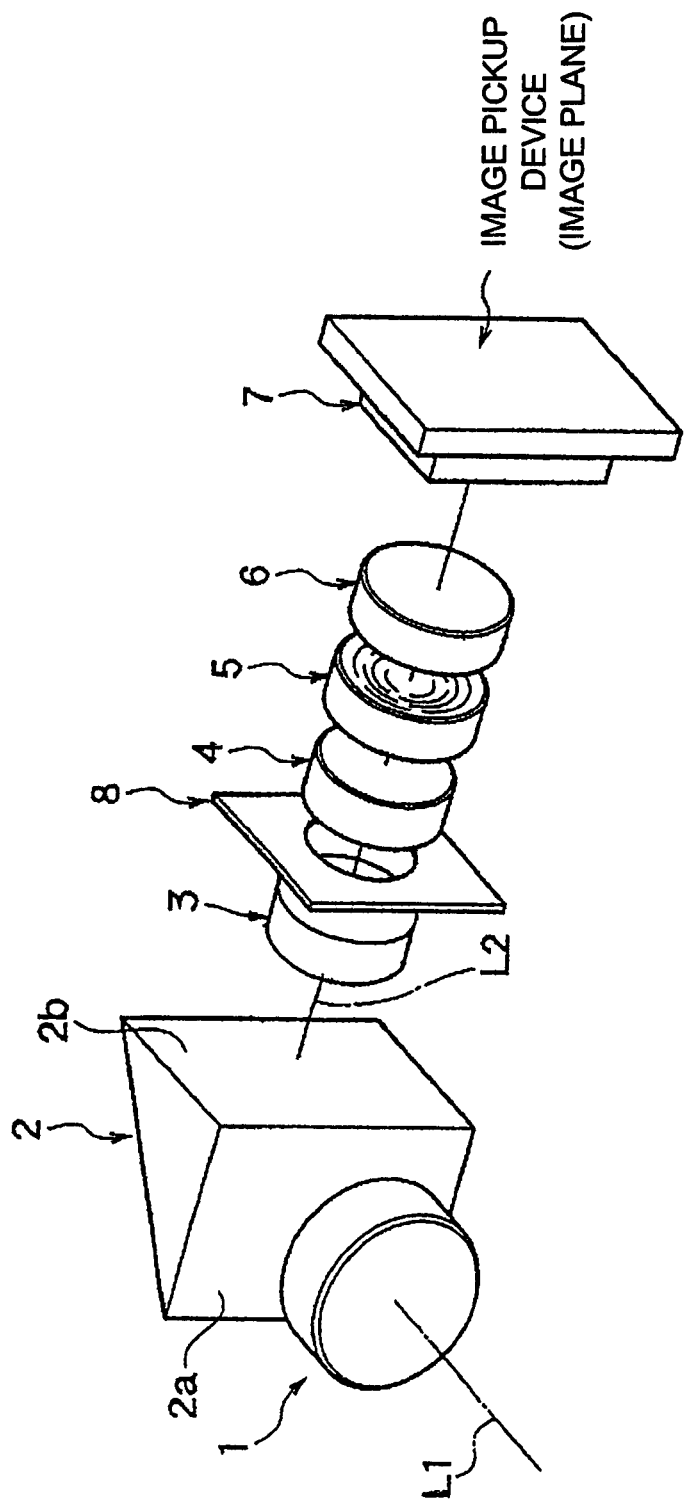
FIG. 3 is a perspective view of the zoom lens shown in FIG. 1.

FIG. 1 through FIG. 3 show a preferred embodiment of a zoom lens according to the present invention, wherein FIG. 1 shows its basic constitution, FIGS. 2(a) and (b) show a side view of the positional relations at the wide-angle and at the telephoto end, and FIG. 3 is a perspective view of the embodiment.

In this zoom lens, a first lens group (I) that has a negative refractive power as a whole, a second lens group (II) that has a positive refractive power as a whole and a third lens group (III) that has a positive refractive power as a whole are laid out in that order from the objective side to the image plane side as shown in FIG. 1.

The first lens group (I) consists of a lens 1 that has a negative refractive power and a prism 2 that changes the light path. The second lens group (II) consists of a lens 3 that has a positive refractive power. The third lens group (III) consists of a lens 4 that has a positive refractive power, a lens 5 that has a negative refractive power, and a lens 6 that has a positive or negative refractive power.

The lenses and the prisms that constitute the first lens group (1), the second lens group (II), and the third lens group (III) are all made of resin materials. As they are made of resin materials, they can light and inexpensive.

In the above embodiment, a glass filter 7 such as an infrared cut filter or a low pass filter is provided on the image side relative to lens 6 of the third lens group (III), and an aperture stop 8 is provided between the second lens group (II) and the third lens group (III), i.e., between lens 3 and lens 4. Since aperture 8 is located in the position as mentioned above, it is possible to make the lens groups arrange on both sides of it to have approximately equal outer diameters, thus reducing the size as a whole.

In the above embodiment, the second lens group (II) and the third lens group (III) move from the image surface. e to the object side, in other words, from the wide-angle end shown in FIG. 2(a) to the telephoto end as shown in FIG. 2(b) to perform the zooming operation as well as to correct the image plane change caused by the zooming operation. Since the depth dimension D of the lens and the lateral total length H of the lens (distance from prism 2 of the first lens group (I) to the image plane) are unchanged during the zooming operation, it can be easily mounted on cellular telephones, portable information terminals and the like where the mounting spaces are limited.

The focal length of the first lens group (I) is denoted f1, the focal length of the total lens system at the wide-angle end is fw, the focal length of the total lens system at the telephoto end is ft, and the focal length of the total lens system in the middle range is fm.

The surfaces of lens 1, prism 2, lens 3 through lens 6 are denoted Si (i=1–6, 8–13), the radius of curvature of each surface Si is Ri (i=1–6, 8–13), the refractive index relative to line "d" is Ni, and the Abbe number is vi (i=1–6) as shown in FIG. 1.

As to glass filter 7, the surfaces are denoted Si (i=14, 15), the curvature radius of surface Si is Ri (i=14, 15), the refractive index relative to line "d" is N7, and the Abbe number as ν7. Further, each space (thickness, air gap) located between lens 1 and glass filter 7 along the optical axis is denoted Di (i=1–14).

In prism 2, its entrance surface 2a and exit surface 2b are formed in rectangular shapes that are oblong in a direction perpendicular to a plane that contains entrance axis L1 and exit axis L2. In this case, the direction of the longer side of prism 2 and the direction of the longer side of image pickup device (image plane) coincide with each other as shown in FIG. 3. As a result, the depth dimension D in the entrance axis L1 direction of the first lens group (I), i.e., the zoom lens, can be reduced, thus making the unit thinner.

A surface S2 with a smaller curvature radius between a surface S1 of the object side of lens 1 and surface S2 of image plane side is formed as an aspherical surface, wherein this aspherical surface is formed in such a way that its negative refractive power weakens toward the periphery. As a result, corrections of various aberrations, in particular, correction of distortion, can be achieved.

A surface S5 on the object side of lens 3, a surface S8 on the object side of lens 4, and a surface S12 on the object side of lens 6 are formed as aspherical surfaces. Consequently, various aberrations can be adjusted in a good balance, and spherical aberrations can be corrected suitably, especially by forming surface S8 as an aspherical surface.

An aspherical surface can be expressed in the following formula:

$$Z = Cy^2/[1+(1-\in C^2 Y^2)^{1/2}] + Dy^4 + Ey^6 + Fy^8 + Gy^{10},$$

where Z is the distance from the vertex of the aspherical surface to a point on the aspherical surface whose height from the optical axis is y; y is the height from the optical axis X; C is the ratio of curvature (1/R) at the vertex of the aspherical surface; $\in$ is the conical constant, and D, E, F, and G are aspherical coefficients.

In the above embodiment, the first lens group (I) is formed to satisfy the following two formulas:

$$0.25 < |fw/f1| < 0.7, \text{ and} \quad (1)$$

$$\nu 1 > 40, \quad (2)$$

where f1 is the focal length of the first lens group (I), fw is the focal length of the total lens system at the wide-angle end, and ν1 is the Abbe number of the lens of the first lens group (I).

The conditional formula (1) defines the ratio of an appropriate focal length for the first lens group (I), where if the ratio exceeds the upper limit, the back focus becomes too large, so that it becomes difficult to make the unit smaller as well as to correct astigmatism and coma aberrations; on the other hand if it exceeds its lower limit, the refractive power of lens 1 becomes too small, so that it becomes difficult to secure a necessary back focus. In other words, it is possible to achieve a satisfactory optical capability and reduce the size of the unit by satisfying this conditional formula (I).

The conditional formula (2) defines the Abbe number of lens 1 that constitutes the first lens group (I), where if Abbe number is less than the lower limit it becomes difficult to correct the lateral chromatic aberration. In other words, by satisfying the conditional formula (2), lateral chromatic aberration can be corrected appropriately.

As an example using specific numerical values of the above embodiment, an embodiment 1 will be shown below. Table 1 shows the major dimensions of embodiment 1, Table 2 shows various numerical data (setup values), Table 3 shows numerical values of the aspheric surfaces, and Table 4 shows the focal length of the lens as a whole "f" (wide-angle end fw, middle position fm, and telephoto end ft) as well as numerical data concerning the spacing between the surfaces on the axis D4, D6 and D13 at the wide-angle end, middle position, and telephoto end specifically. In this example, the numerical data of the conditional formulas (1) and (2) are: |fw/f1|=0.476, fw=3.350 mm, f1=−7.039 mm, and ν1=56.4

FIGS. 4(a)–(d), FIGS. 5(a)–(d) and FIGS. 6(a)–(d) are the aberration charts of spherical aberration, astigmatic aberration, distortion, and lateral chromatic aberration at the wide-angle end, middle position, and telephoto end respectively. In FIG. 4(a) through FIG. 6(d), FIG. 9(a) through FIG. 11(d), and FIG. 14(a) through FIG. 16(d), "d" denotes the aberration due to "d" line, "F" denotes the aberration due to "F" line, and "c" denotes the aberration due to "c" line, while SC denotes the amount of dissatisfaction of the sine condition, DS denotes the aberration on the sagittal plane, and DT denotes the aberration of the meridional plane.

TABLE 1

| Object distance (mm) | Infinity(∞) | Thickness of third lens group (mm) | 7.20 |
|---|---|---|---|
| Focal length (mm) | 3.35~5.00~6.43 | Total lateral length (prism to image plane) mm | 25.28 |
| F number | 2.89~3.41~3.94 | Back focus (air conversion) (mm) | 268~3.99~5.36 |
| Total lens length (front of lens 1 to image surface) (mm) | 28.23 | Angle of view (2ω) | 61.3°~40.0°~31.1° |
| Thickness of first lens group (depth) (mm) | 7.75 | Focal length f1 (mm) | −7.039 |
| Thickness of second lens group (mm) | 1.80 | Wide-angle end focal length fw (mm) | 3.350 |

TABLE 2

| Surface | | Curvature radius (mm) | Distance (mm) | | Refractive index ("d" line) | Abbe number |
|---|---|---|---|---|---|---|
| S1 | R1 | −105.256 | D1 | 1.250 | N1 1.50914 ν1 | 56.4 |
| S2* | R2 | 3.725 | | | | |
| | | | D2 | 1.700 | | |
| S3 | R3 | ∞ | D3 | 4.800 | N2 1.58385 ν2 | 30.3 |
| S4 | R4 | ∞ | | | | |
| | | | D4 | variable | | |
| S5* | R5 | 14.566 | D5 | 1.800 | N3 1.50914 ν3 | 56.4 |
| S6 | R6 | −13.487 | | | | |
| | | | D6 | variable | | |
| S7 | | Aperture stop | | | | |
| | | | D7 | 0.000 | | |
| S8* | R8 | 4.291 | D8 | 2.500 | N4 1.50914 ν4 | 56.4 |
| S9 | R9 | −27.904 | | | | |
| | | | D9 | 0.800 | | |
| S10 | R10 | −50.000 | D10 | 1.500 | N5 1.58385 ν5 | 30.3 |
| S11 | R11 | 6.916 | | | | |
| | | | D11 | 0.900 | | |
| S12* | R12 | 12.944 | D12 | 1.500 | N6 1.50914 ν6 | 56.4 |
| S13 | R13 | 14.260 | | | | |
| | | | D13 | variable | | |
| S14 | R14 | ∞ | D14 | 1.200 | N7 1.51680 ν7 | 64.2 |
| S15 | R15 | ∞ | | | | |

*Aspheric

TABLE 3

| Aspherical surface coefficient | | Numerical data |
|---|---|---|
| S2 surface | ε | 1.0278000 |
| | D | $-0.1581560 \times 10^{-2}$ |
| | E | $0.1204590 \times 10^{-3}$ |
| | F | $-0.5290880 \times 10^{-5}$ |
| | G | $-0.1085100 \times 10^{-5}$ |
| S5 surface | ε | 14.1500000 |
| | D | $0.9513050 \times 10^{-4}$ |
| | E | $0.4852330 \times 10^{-4}$ |
| | F | $-0.2827050 \times 10^{-4}$ |
| | G | $-0.1499290 \times 10^{-5}$ |
| S8 surface | ε | 0.0000000 |
| | D | $0.5818800 \times 10^{-3}$ |
| | E | $0.7729490 \times 10^{-4}$ |
| | F | $-0.2913690 \times 10^{-5}$ |
| | G | $0.6163560 \times 10^{-6}$ |
| S12 surface | ε | 1.0000000 |
| | D | $-0.6068020 \times 10^{-2}$ |
| | E | $-0.6726320 \times 10^{-5}$ |
| | F | $0.1080110 \times 10^{-4}$ |
| | G | $-0.2055410 \times 10^{-5}$ |

TABLE 4

| | Wide-angle end | Middle position | Telephoto end |
|---|---|---|---|
| f (mm) | 3.35 (fw) | 5.00 (fm) | 6.43 (ft) |
| D4 (mm) | 7.395 | 3.367 | 1.264 |
| D6 (mm) | 1.000 | 3.713 | 4.450 |
| D13 (mm) | 0.885 | 2.200 | 3.567 |

(Back focus 1.00 mm)

In the above embodiment 1, lens depth D (lens 1 to prism 2) is 7.75 mm, total lens length (prism to image surface) H is 25.28 mm, total lens length (front S1 of lens 1 to image surface) is 28.23 mm, back focus (air conversion) is 2.68 mm–3.99 mm–5.36 mm, F number is 2.89–3.41–3.94, and angle of view (2ω) is 61.3°–40.0°–31.1°, thus providing a compact, thin, and a high optical capability lens with all aberrations suitably corrected.

Figure 7:
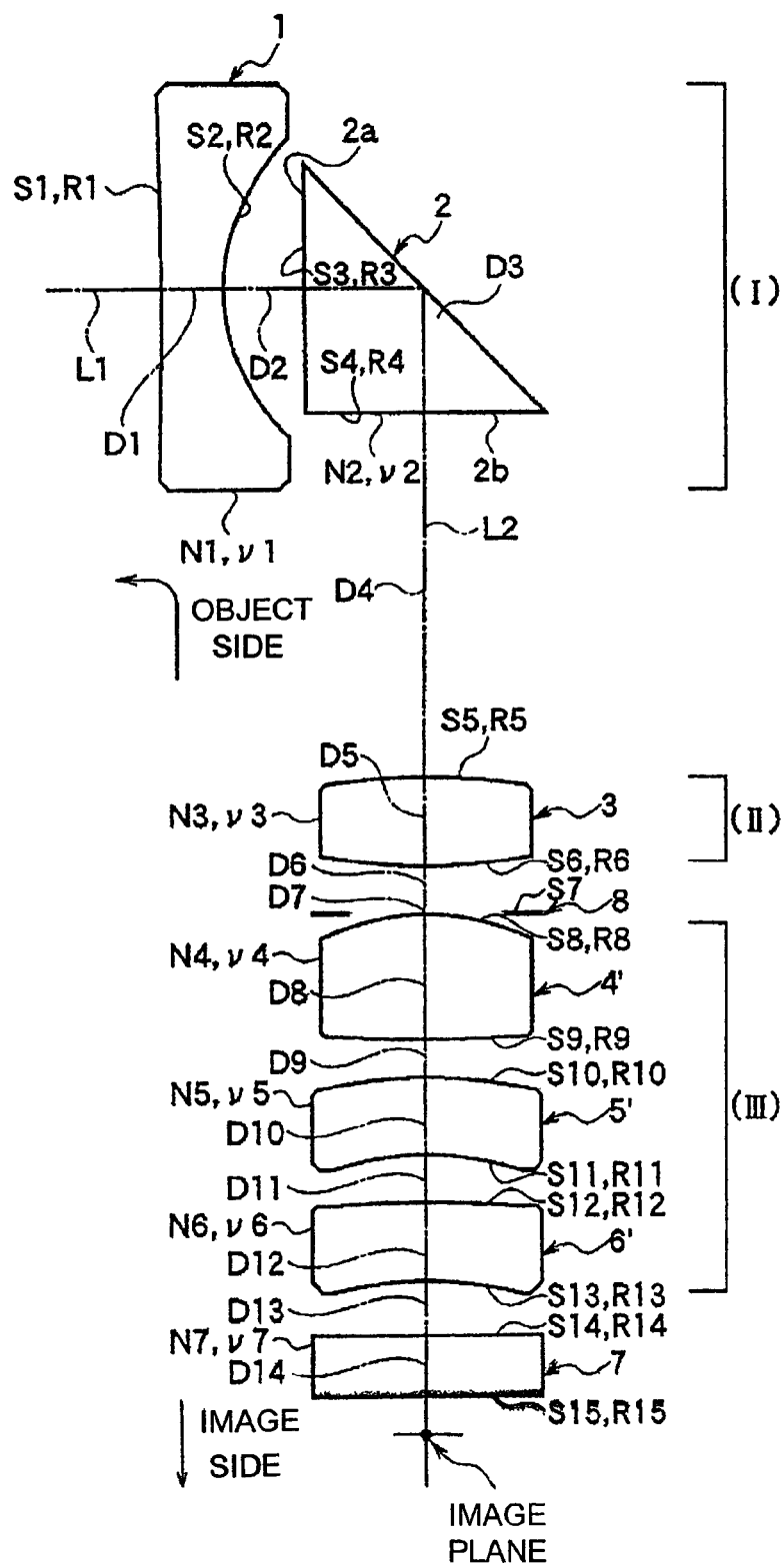
FIG. 7 is a drawing showing another embodiment of a zoom lens according to the present invention.

FIG. 7 and FIG. 8 show the basic constitution of a zoom lens of another embodiment according to this invention. All components of this zoom lens are made of plastics (resins) and the zoom lens is constituted similarly to the above mentioned embodiment except the changes made in the specifications of lens 4', lens 5' and lens 6' of the third lens group (III).

As an example using specific numerical values of the above embodiment, an embodiment 2 will be shown below. Table 5 shows the major dimensions of embodiment 2, Table 6 shows various numerical data (setup values), Table 7 shows numerical values of the aspheric surfaces, and Table 8 shows the focal length of the lens as a whole "f" (wide-angle end fw, middle position fm, and telephoto end ft) as well as numerical data concerning the spacing between the surfaces on the axis D4, D6 and D13 at the wide-angle end, middle position, and telephoto end specifically. In this example, the numerical data of the conditional formulas are: |fw/f1|=0.476, fw=3.350 mm, f1=−7.039 mm, and νν=56.4

FIGS. 9(a)–(d), FIGS. 10(a)–(d) and FIGS. 11(a)–(d) are the aberration charts of spherical aberration, astigmatic aberration, distortion, and lateral chromatic aberration at the wide-angle end, middle position, and telephoto end respectively.

TABLE 5

| Object distance (mm) | Infinity (∞) | Thickness of third lens group (mm) | 7.20 |
|---|---|---|---|
| Focal length (mm) | 3.35~5.00~6.43 | Total lateral length (prism to image plane) mm | 25.39 |
| F number | 2.89~3.43~3.98 | Back focus (air conversion) (mm) | 2.79~4.08~5.42 |
| Total lens length (front of lens 1 to image surface) (mm) | 28.34 | Angle of view (2ω) | 61.2°~39.9°~31.0° |
| Thickness of first lens group (depth) (mm)) | 7.75 | Focal length f1 (mm) | −7.039 |
| Thickness of second lens group (mm) | 1.80 | Wide-angle end focal length fw (mm) | 3.350 |

TABLE 6

| Surface | | Curvature radius (mm) | Distance | (mm) | Refractive index ("d" line) | | Abbe number |
|---|---|---|---|---|---|---|---|
| S1 | R1 | −105.256 | D1 | 1.250 | N1 | 1.50914 ν1 | 56.4 |
| S2* | R2 | 3.725 | | | | | |
| | | | D2 | 1.700 | | | |
| S3 | R3 | ∞ | D3 | 4.800 | N2 | 1.58385 ν2 | 30.3 |
| S4 | R4 | ∞ | | | | | |
| | | | D4 | variable | | | |
| S5* | R5 | 14.566 | D5 | 1.800 | N3 | 1.50914 ν3 | 56.4 |
| S6 | R6 | −13.487 | | | | | |
| | | | D6 | variable | | | |
| S7 | | Aperture stop | | | | | |
| | | | D7 | 0.000 | | | |
| S8* | R8 | 5.111 | D8 | 2.500 | N4 | 1.50914 ν4 | 56.4 |
| S9 | R9 | −33.812 | | | | | |
| | | | D9 | 0.800 | | | |
| S10 | R10 | 12.088 | D10 | 1.500 | N5 | 1.58385 ν5 | 30.3 |
| S11 | R11 | 5.889 | | | | | |
| | | | D11 | 0.900 | | | |
| S12* | R12 | 14.723 | D12 | 1.500 | N6 | 1.50914 ν6 | 56.4 |
| S13 | R13 | 8.256 | | | | | |
| | | | D13 | variable | | | |
| S14 | R14 | ∞ | D14 | 1.200 | N7 | 1.51680 ν7 | 64.2 |
| S15 | R15 | ∞ | | | | | |

*Aspheric

TABLE 7

| Aspherical surface coefficient | | Numerical data |
|---|---|---|
| S2 surface | ε | 1.1466000 |
| | D | $-0.2082540 \times 10^{-2}$ |
| | E | $0.1196780 \times 10^{-3}$ |
| | F | $-0.9545210 \times 10^{-5}$ |
| | G | $-0.1047680 \times 10^{-5}$ |
| S5 surface | ε | 31.6600000 |
| | D | $-0.6795480 \times 10^{-3}$ |
| | E | $-0.1877220 \times 10^{-3}$ |
| | F | $-0.1244610 \times 10^{-4}$ |
| | G | $0.3063120 \times 10^{-6}$ |
| S8 surface | ε | −0.9200000 |
| | D | $0.1067690 \times 10^{-2}$ |
| | E | $0.9841570 \times 10^{-4}$ |
| | F | $-0.9494250 \times 10^{-5}$ |
| | G | $0.8663850 \times 10^{-6}$ |
| S12 surface | ε | 1.0000000 |
| | D | $-0.5542500 \times 10^{-2}$ |
| | E | $0.8034850 \times 10^{-4}$ |
| | F | $0.9776290 \times 10^{-5}$ |
| | G | $0.1975590 \times 10^{-5}$ |

TABLE 8

|  | Wide-angle end | Middle position | Telephoto end |
|---|---|---|---|
| f (mm) | 3.35 (fw) | 5.00 (fm) | 6.43 (ft) |
| D4 (mm) | 7.395 | 3.434 | 1.379 |
| D6 (mm) | 1.000 | 3.669 | 4.390 |
| D13 (mm) | 0.998 | 2.289 | 3.624 |

(Back focus 1.00 mm)

In the above embodiment 2, lens depth D (lens 1 to prism 2) is 7.75 mm, total lens length (prism to image surface) H is 25.39 mm, total lens length (front S1 of lens 1 to image surface) is 28.34 mm, back focus (air conversion) is 2.79 mm–4.08 mm–5.42 mm, F number is 2.89–3.43–3.98, and angle of view (2ω) is 61.2°–39.9°–31.0°, thus providing a compact, thin, and a high optical capability lens with all aberrations suitably corrected.

Figure 12:
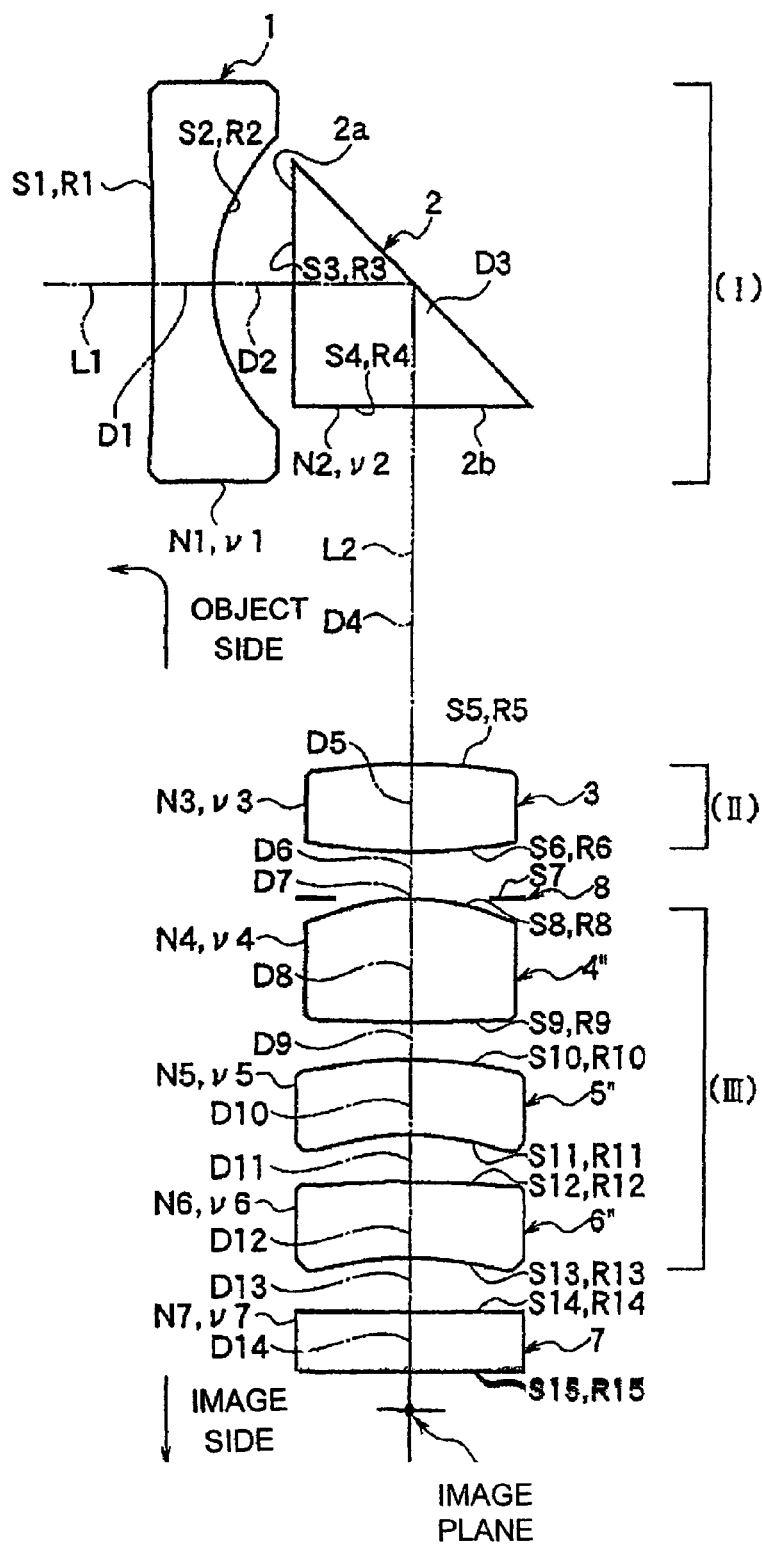
FIG. 12 is a drawing showing yet another embodiment of a zoom lens according to the present invention.
Figure 13:
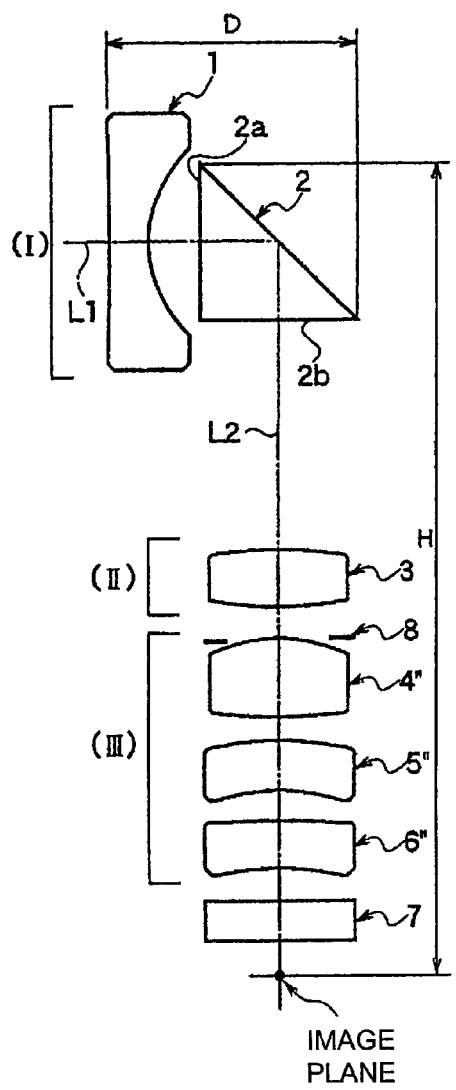
FIGS. 13(a) and (b) show the side views of the zoom lens shown in FIG. 12 at its wide-angle end and telephoto end.
Figure 13:
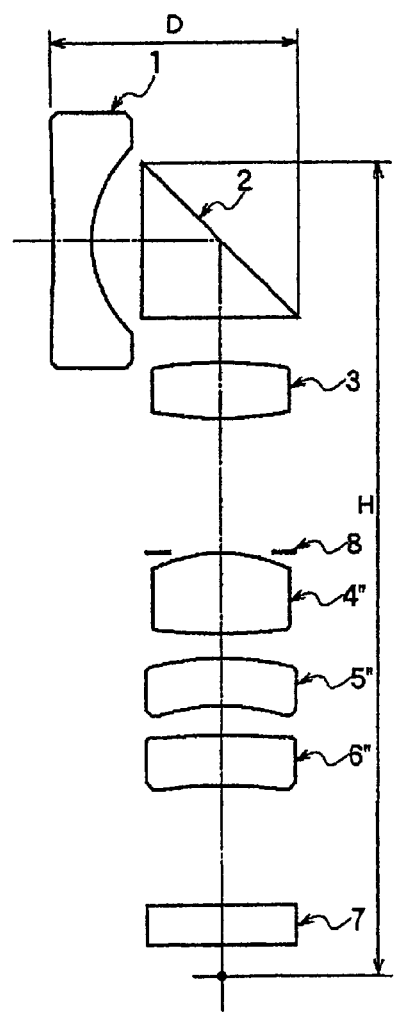

FIG. 12 and FIG. 13 show basic constitutions of zoom lens of other embodiments according to this invention. All components of this zoom lens are made of plastics (resins) and the zoom lens is constituted similarly to the above mentioned embodiment except the changes made in the specifications of lens 4", lens 5" and lens 6" of the third lens group (III).

As an example using specific numerical values of the above embodiment, an embodiment 3 will be shown below. Table 9 shows the major dimensions of embodiment 3, Table 10 shows various numerical data (setup values), Table 11 shows numerical values of the aspheric surfaces, and Table 12 shows the focal length of the lens as a whole "f" (wide-angle end fw, middle position fm, and telephoto end ft) as well as numerical data concerning the spacing between the surfaces on the axis D4, D6 and D13 at the wide-angle end, middle position, and telephoto end specifically. In this example, the numerical data of the conditional formulas (1) and (2) are: |fw/f1|=0.476, fw=3.350 mm, f1=−7.039 mm, and νν=56.4

FIGS. 14(a)–(d), FIGS. 15(a)–(d) and FIGS. 16(a)–(d) are the aberration charts of spherical aberration, astigmatic aberration, distortion, and lateral chromatic aberration at the wide-angle end, middle position, and telephoto end respectively.

TABLE 9

| Object distance (mm) | Infinity (∞) | Thickness of third lens group (mm) | 7.20 |
|---|---|---|---|
| Focal length (mm) | 3.35~5.00~6.43 | Total lateral length (prism to image plane) mm | 25.35 |
| F number | 2.89~3.43~3.97 | Back focus (air conversion) (mm) | 2.75~4.04~5.37 |
| Total lens length (front of lens 1 to image surface) (mm) | 28.30 | Angle of view (2ω) | 61.1°~39.9°~31.0° |
| Thickness of first lens group (depth) (mm) | 7.75 | Focal length f1 (mm) | −7.039 |
| Thickness of second lens group (mm) | 1.80 | Wide-angle end focal length fw (mm) | 3.350 |

TABLE 10

| Surface | Curvature radius (mm) | | Distance (mm) | | Refractive index ("d" line) | | Abbe number |
|---|---|---|---|---|---|---|---|
| S1 | R1 | −105.256 | D1 | 1.250 | N1 | 1.50914 ν1 | 56.4 |
| S2* | R2 | 3.725 | | | | | |
| | | | D2 | 1.700 | | | |
| S3 | R3 | ∞ | D3 | 4.800 | N2 | 1.58385 ν2 | 30.3 |
| S4 | R4 | ∞ | | | | | |
| | | | D4 | variable | | | |
| S5* | R5 | 14.566 | D5 | 1.800 | N3 | 1.50914 ν3 | 56.4 |
| S6 | R6 | −13.487 | | | | | |
| | | | D6 | variable | | | |
| S7 | Aperture stop | | | | | | |
| | | | D7 | 0.000 | | | |
| S8* | R8 | 4.696 | D8 | 2.500 | N4 | 1.50914 ν4 | 56.4 |
| S9 | R9 | 93.726 | | | | | |
| | | | D9 | 0.800 | | | |
| S10 | R10 | 10.987 | D10 | 1.500 | N5 | 1.58385 ν5 | 30.3 |
| S11 | R11 | 6.348 | | | | | |
| | | | D11 | 0.900 | | | |
| S12* | R12 | 13.654 | D12 | 1.500 | N6 | 1.50914 ν6 | 56.4 |
| S13 | R13 | 7.861 | | | | | |
| | | | D13 | variable | | | |
| S14 | R14 | ∞ | D14 | 1.200 | N7 | 1.51680 ν7 | 64.2 |
| S15 | R15 | ∞ | | | | | |

*Aspheric

TABLE 11

| Aspherical surface coefficient | | Numerical data |
|---|---|---|
| S2 surface | ε | 1.1291000 |
| | D | −0.1921580 × 10$^{-2}$ |
| | E | 0.1173390 × 10$^{-3}$ |
| | F | −0.9858780 × 10$^{-5}$ |
| | G | −0.1009840 × 10$^{-5}$ |
| S5 surface | ε | 32.1400000 |
| | D | −0.5846820 × 10$^{-3}$ |
| | E | −0.1789410 × 10$^{-3}$ |
| | F | −0.1522010 × 10$^{-4}$ |
| | G | 0.3046050 × 10$^{-6}$ |
| S8 surface | ε | −0.5500000 |
| | D | 0.1140500 × 10$^{-2}$ |
| | E | 0.8869180 × 10$^{-4}$ |
| | F | −0.7484270 × 10$^{-5}$ |
| | G | 0.1166400 × 10$^{-5}$ |
| S12 surface | ε | 1.0000000 |
| | D | −0.6099420 × 10$^{-2}$ |
| | E | 0.6410210 × 10$^{-4}$ |
| | F | 0.8377440 × 10$^{-5}$ |
| | G | 0.1930490 × 10$^{-5}$ |

TABLE 12

|  | Wide-angle end | Middle position | Telephoto end |
|---|---|---|---|
| f (mm) | 3.35 (fw) | 5.00 (fm) | 6.43 (ft) |
| D4 (mm) | 7.395 | 3.443 | 1.394 |
| D6 (mm) | 1.000 | 3.663 | 4.382 |
| D13 (mm) | 0.957 | 2.245 | 3.575 |

(Back focus 1.00 mm)

In the above embodiment 3, lens depth D (lens 1 to prism 2) is 7.75 mm, total lens length (prism to image surface) H is 25.35 mm, total lens length (front S1 of lens 1 to image surface) is 28.30 mm, back focus (air conversion) is 2.75 mm–4.04 mm–5.37 mm, F number is 2.89–3.43–3.97, and angle of view (2ω) is 61.1°–39.9°–3 1.0°, thus providing a compact, thin, and a high optical capability lens with all aberrations suitably corrected.

What is claimed is:

1. A zoom lens comprising: a first lens group having a negative refractive power as a whole, a second lens group having a positive refractive power as a whole, and a third lens group having a positive refractive power as a whole, arranged in said order from object side to image side, for zooming from a wide-angle end to a telephoto end as well as for correcting image surface changes required in accordance with said zooming by means of moving said second lens group and said third lens group from image side to object side; wherein said first lens group consists of a lens having a negative refractive power and a prism for changing a light path arranged in said order from the object side.

2. A zoom lens claimed in claim 1 wherein, said second lens group consists of a lens having a positive refractive power; and an aperture stop is provided between said second lens group and said third lens group.

3. A zoom lens claimed in claim 1 wherein, said first lens group's lens has an aspherical surface.

4. A zoom lens claimed in claim 3 wherein, said aspherical surface is formed on a surface with a smaller curvature radius.

5. A zoom lens claimed in claim 4 wherein, said aspherical surface is formed to have a weaker negative refractive power weakening toward its periphery.

6. A zoom lens claimed in claim 1 wherein, said third lens group has at least one lens with a positive refractive power and at least one lens with a negative refractive power.

7. A zoom lens claimed in claim 6 wherein, said third lens group has a lens at a position closest to the object having a positive refractive power and an aspherical surface at least on one side.

8. A zoom lens claimed in claim 1 wherein, the prism of said first lens group is formed to have an entrance surface and an exit surface both oblong in a direction perpendicular to a plane that includes an entrance axis and an exit axis.

9. A zoom lens claimed in claim 1 that satisfies the following equations (1) and (2):

$$0.25 < |fw/f1| < 0.7, \text{ and} \quad (1)$$

$$v1 > 40, \quad (2)$$

where
f1: focal length of the first lens group,
fw: focal length of the total lens system at the wide-angle end, and
v1: Abbe number of the first lens group's lens.

10. A zoom lens claimed in claim 1 wherein, said first, second, and third lens groups are all made of resin materials.

11. A zoom lens claimed in claim 2 wherein, said first lens group's lens has an aspherical surface.

12. A zoom lens claimed in claim 2 wherein, said third lens group has at least one lens with a positive refractive power and at least one lens with a negative refractive power.

13. A zoom lens claimed in claim 3 wherein, said third lens group has at least one lens with a positive refractive power and at least one lens with a negative refractive power.

14. A zoom lens claimed in claim 2 wherein, the prism of said first lens group is formed to have an entrance surface and an exit surface both oblong in a direction perpendicular to a plane that includes an entrance axis and an exit axis.

15. A zoom lens claimed in claim 3 wherein, the prism of said first lens group is formed to have an entrance surface and an exit surface both oblong in a direction perpendicular to a plane that includes an entrance axis and an exit axis.

16. A zoom lens claimed in claim 2 that satisfies the following equations (1) and (2):

$$0.25 < |fw/f1| < 0.7, \text{ and} \quad (1)$$

$$v1 > 40 \quad (2)$$

where
f1: focal length of the first lens group,
fw: focal length of the total lens system at the wide-angle end, and
v1: Abbe number of the first lens group's lens.

17. A zoom lens claimed in claim 3 that satisfies the following equations (1) and (2):

$$0.25 < |fw/f1| < 0.7, \text{ and} \quad (1)$$

$$v1 > 40 \quad (2)$$

where
f1: focal length of the first lens group,
fw: focal length of the total lens system at the wide-angle end, and
v1: Abbe number of the first lens group's lens.

18. A zoom lens claimed in claim 9 wherein, said first, second, and third lens groups are all made of resin materials.

* * * * *